April 29, 1924.
C. STOEFFLER
RAT OR MOUSE TRAP
Filed March 30, 1923
1,491,829
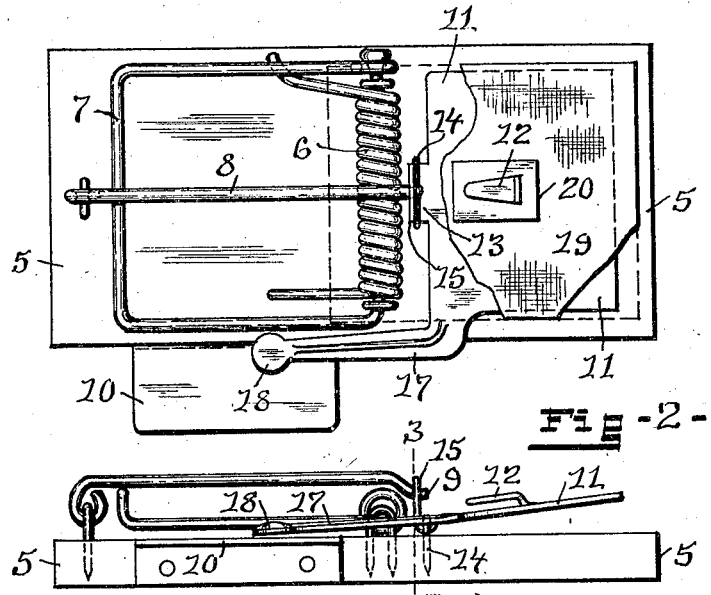
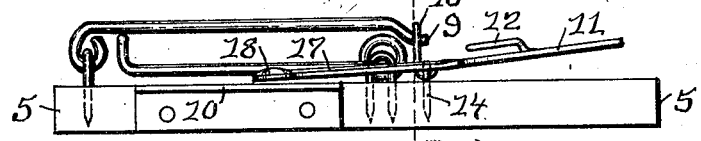
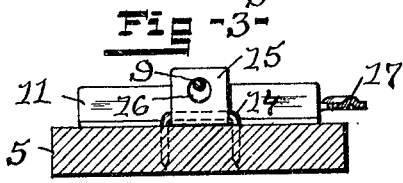
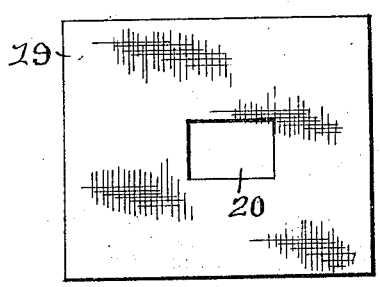
INVENTOR:
Charles Stoeffler
By Chas. W. Luther
ATTORNEY:

Patented Apr. 29, 1924.

1,491,829

UNITED STATES PATENT OFFICE.

CHARLES STOEFFLER, OF PROVIDENCE, RHODE ISLAND.

RAT OR MOUSE TRAP.

Application filed March 30, 1923. Serial No. 628,871.

*To all whom it may concern:*

Be it known that I, CHARLES STOEFFLER, a citizen of the United States, residing at Providence, in the county of Providence and State of Rhode Island, have invented a new and useful Improvement in Rat or Mouse Traps, of which the following is a specification.

My invention has reference to an improvement in animal traps and more particularly to an improvement in rat or mouse traps.

My invention is particularly adapted to the form of a rat or mouse trap which has a flat rectangular shaped wooden base on which are the working parts of the trap. These working parts are made of wire and consist of a strong coiled spring secured to the base and operatively connected to a pivoted U shaped wire jaw held in its set or open position under spring tension, by a wire tongue, which in turn is held down over the U shaped wire jaw by a bait latch, on which the bait is placed. Such a trap is extremely sensitive in operation and having no adequate provision for holding the trap to set it, accidents have occurred in which the trap has sprung accidentally and bruised if not seriously injured the fingers, used in holding and setting the trap.

The object of my invention is to improve the construction of such a rat or mouse trap whereby the trap is provided with safe means for holding the trap while the trap is being set and also with safe means for locking the trap in the set condition, until the trap is placed where it is intended to go.

My invention consists in the peculiar and novel construction of a rat or mouse trap, said rat or mouse trap having details of construction, as will be more fully set forth hereinafter and claimed.

Figure 1 is a top plan view of my improved rat or mouse trap, showing the cloth member partly broken away, to more clearly show my invention.

Figure 2 is a side edge view of Figure 1.

Figure 3 is a transverse sectional view taken on line 3, 3 of Figure 2 looking in the direction of the arrow *a*, and Figure 4 is a top plan view of the cloth member of the trap.

In the drawing 5 indicates the rectangular shaped wooden base on which the wire mechanism of the trap is secured. This consists of a horizontal coiled spring 6 secured to the base 5 and operatively connected to a pivoted U shaped wire jaw 7. This jaw 7 and one end of the base 5 forming the usual jaws of the trap. When the jaw 7 is in the set position as shown in Figures 1 and 2, a wire tongue 8, pivoted at one end to the base 5, extends over the jaw 7 and has a slight upwardly bent end 9, all of which is old in this form of a trap.

On the side edge of the base 5 is secured an outwardly extending flat hand hold 10, as shown in Figures 1 and 2, for holding the trap in setting the trap and for carrying the trap to the place where it is intended to be set.

A comparatively large sheet metal plate 11 is constructed to have a bait hook 12 for securing bait to the plate, a narrow neck 13 pivotally secured to the base 5 by an inverted U shaped staple 14. This neck 13 has an upwardly bent end 15 in which is a hole 16, for the end 9 of the tongue 8, as shown in Figure 3. On the plate 11 is a side arm 17 having a thumb end 18 which extends over the hand hold 10, as shown in Figures 1 and 2.

A piece of cloth 19 of any desired size or shape and having a central hole 20, as shown in Figure 4, is placed over the trap in a position to bring the hole 20 in the cloth over the bait hook 12, whereby the bait not shown is easily seen or smelled through the hole 20 in the cloth and the plate 11 having the bait, is concealed.

When not in use the jaw 7 lays over onto the jaw end of the base 5, in an opposite position to that shown in Figure 1, which is the set position. In setting the trap the bait hook 12 is first baited, the setter of the trap holding the trap by the hand hold 10. The jaw 7 is then forced over into the position as shown in Figure 1 against the tension of the coiled spring 6 and the tongue 8 carried over the jaw 7. The side arm 17 is now depressed by the thumb on the thumb end 18, so as to insert the end 9 of the tongue 8 through the hole 16 in the end 15 of the neck 13, on the plate 11. The cloth 19 is now placed on the trap, in the position, as shown in Figure 1, so that the bait is exposed through the hole 20 in the cloth. The trap is now held in a locked condition against accidental springing of the trap and is thus held locked until the trap is placed where it is intended to go. When so placed the pressure on the arm 17 is released and the trap is now in the set condition, ready to be sprung by a rat or mouse.

It is evident that the construction of my improved rat or mouse trap could be materially modified, within the scope of the appended claims.

Having thus described my invention I claim as new:—

1. A rat or mouse trap having a flat base, wire trap mechanism on the base, as described, a hand hold on the side of the base, a flat plate having a bait hook and pivotally secured to the base, said flat plate having means which cooperates with the trap mechanism, a side arm on the flat plate and extending over the hand hold, a cloth having a central hole and placed on the trap so as to partly cover the trap and expose bait on the bait hook through the hole in the cloth, all for the purpose as described.

2. A rat or mouse trap having a flat base, wire trap mechanism on the base, as described, a flat plate on the side of the base and forming a hand hold, a flat bait plate approximately the width of the base and having a central bait hook, said bait plate being pivotally secured to the base and having means which cooperates with the wire trap mechanism, a side arm on the flat bait plate and extending over the side hand hold, a cloth having a central hole and placed over the bait plate so as to expose bait on the bait hook through the hole in the cloth, all for the purpose as described.

In testimony whereof, I have set my hand to this specification.

CHARLES STOEFFLER.